(12) United States Patent
Li et al.

US009002865B2

(10) Patent No.: US 9,002,865 B2
(45) Date of Patent: Apr. 7, 2015

(54) DISPLAYING RANKED CATEGORIES OF DATA IN A VENN DIAGRAM

(75) Inventors: Jin Li, Toronto (CA); David K. Modieska, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1990 days.

(21) Appl. No.: 11/839,692

(22) Filed: Aug. 16, 2007

(65) Prior Publication Data

US 2009/0046898 A1    Feb. 19, 2009

(51) Int. Cl.
*G06F 17/30*      (2006.01)
*G06F 7/00*       (2006.01)
*G06Q 10/10*      (2012.01)

(52) U.S. Cl.
CPC .......... *G06Q 10/10* (2013.01); *G06F 17/30554* (2013.01); *G06F 17/3053* (2013.01)

(58) Field of Classification Search
USPC ................ 707/1–10, 104.1, 758, 723, 738
See application file for complete search history.

(56) References Cited

U.S. PATENT DOCUMENTS

| | | | |
|---|---|---|---|
| 5,966,126 A * | 10/1999 | Szabo | 715/762 |
| 6,381,556 B1 | 4/2002 | Kazemi et al. | |
| 7,110,956 B1 | 9/2006 | Drake, Jr. et al. | |
| 2006/0212324 A1 | 9/2006 | Okman et al. | |
| 2006/0265188 A1 | 11/2006 | French et al. | |
| 2007/0174252 A1 * | 7/2007 | Rawlings et al. | 707/3 |
| 2008/0222140 A1 * | 9/2008 | Lagad et al. | 707/5 |

OTHER PUBLICATIONS

Park et al., "Limitations in Predicting Defect Level Based on Stuck-at Fault Coverage," Proceedings of the 12th IEEE VLSI Test Symposium, Cherry Hill, New Jersey, Apr. 1994, pp. 186-191.
Serulnik et al., "Automatic Defect Classification using Topography Map from SEM Photometric Stereo," Proceedings of SPIE, Data Analysis and Modeling for Process Control, vol. 5378, Bellingham, WA, Feb. 2004, pp. 124-133.
Unknown, "Graphical Displays of Data II," http://engrwww.usask.ca/classes/GE/210/CE%20225%20Webpage%20files/LECTURES/Lecture%204/Corrected%20Lecture%204.pdf., date unknown, 11 pages.
Lin et al., "Fuzzy control chart for software defects management," International Multi-Conference on Engineers and Computer Scientists, Jun. 2006, Abstract Only, 1 page.
Rennison, Earl, "Galaxy of News an Approach to Visualizing and Understanding Expansive News Landscapes," Visible Language Workshop, MIT Media Lab, date unknown, 10 pages.

(Continued)

*Primary Examiner* — Hosain Alam
*Assistant Examiner* — Navneet K Ahluwalia
(74) *Attorney, Agent, or Firm* — Ryan Lewis; Hoffman Warnick LLC (57) ABSTRACT

A solution that displays ranked categories of data in a Venn diagram is provided. In particular, entries of data are assigned to one of a plurality of categories based on one or more attributes of the entries. The categories are then ranked for each of one or more criteria. Each criterion can use a unique set of the attributes to rank the categories. A Venn diagram is generated that includes a circle for each criterion and displays the rankings of the various categories using one or more visual representations of each category. For example, the rankings can be displayed using tag clouds for each category that are placed in each circle. Two or more circles can overlap in which case categories that have one or more entries that meet all the corresponding criteria can be displayed in the overlapping portion of the circles.

20 Claims, 5 Drawing Sheets

(56) References Cited

OTHER PUBLICATIONS

Unknown, "ROLAP," http://en.wikipedia.org/wiki/ROLAP, printed Jul. 30, 2007, 3 pages.

Unknown, "What is Scatter/Gather? Grouping Documents using Text Clustering," http://www.ischool.berkeley.edu/~hearst/images/sg-background.html, 1997, 2 pages.

Unknown, "Tag cloud," http://en.wikipedia.org/wiki/Tag_cloud, printed Jul. 30, 2007, 3 pages.

Unknown, "About TileBars," http://www.ischool.berkeley.edu/~hearst/images/tb-background.html, 1997, 3 pages.

Unknown, "Using the Visual Thesaurus," Thinkmap Inc., http://www.visualthesaurus.com/howitworks/manual.jsp, printed Jul. 30, 2007, 19 pages.

Lin et al., "Fuzzy Control Chart for Software Defects Management," International Multi-Conference on Engineers and Computer Scientists, IMECS, Jun. 2006, pp. 86-91.

* cited by examiner

DISPLAYING RANKED CATEGORIES OF DATA IN A VENN DIAGRAM

TECHNICAL FIELD

The disclosure relates generally to user interfaces, and more particularly, to a user interface for viewing system data.

BACKGROUND ART

"The Long Tail" is a phrase that has been used to describe a particular type of statistical distribution. In The Long Tail distributions, a high frequency/amplitude population is followed by a low frequency/amplitude population, with the low frequency/amplitude population making up the majority of the distribution. Such a distribution occurs in some business environments. For example, a company may offer numerous products that are in low demand and/or have a low sales volume. However, with a sufficiently large distribution channel, the cumulative sales volume/demand for these products may comprise a market share that rivals or exceeds the relatively fewer high demand/sales volume products offered by the company.

In system development (e.g., information system development), various issues with respect to a system being developed/maintained can be tracked and stored in a database. For example, various defects, customer requirements, help topics, and/or the like, which have been identified for possible action (e.g., resolution, implementation, etc.) can be tracked in a database. Typically, a manager/developer will select a subset of the high priority issues based on a single attribute (e.g., severity) and address these first for inclusion in a subsequent release. In this approach, it is presumed that addressing this subset of issues will provide the maximum benefit given the constraints on time and resources. However, this approach often filters out issues having a lower priority for the attribute, sometimes permanently, due to continually discovered higher priority issues.

Relational databases provide a variety of query tools for retrieving and filtering data. However, it is often difficult to analyze the data, such as comparing two result sets. Various visual approaches have been proposed for assisting a user in querying data. These approaches include presenting the user with a graphical indication of the location of a query term in a document, recombining document subsets using lists of keywords, using tag clouds to present a qualitative characterization of a data set on the basis of a fixed attribute, and/or the like. Further, other approaches graphically present data in a dataset as a series of connected nodes, bar charts based on quantity, and/or the like, which enable a user to drill down on records.

SUMMARY OF THE INVENTION

Aspects of the invention provide a solution that displays ranked categories of data in a Venn diagram. In particular, entries of data are assigned to one of a plurality of categories based on one or more attributes of the entries. The categories are then ranked for each of one or more criteria. Each criterion can use a unique set of the attributes to rank the categories. A Venn diagram is generated that includes a circle for each criterion and displays the rankings of the various categories using one or more visual representations of each category. For example, the rankings can be displayed using tag clouds for each category that are placed in each circle. Two or more circles can overlap in which case categories that have one or more entries that meet all the corresponding criteria can be displayed in the overlapping portion of the circles. In this manner, a user can utilize the Venn diagram to identify relationships between various criteria and the corresponding entries, and as a result, more readily identify high value/priority entries.

A first aspect of the invention provides a method of managing data, the method comprising: assigning each of a plurality of entries in the data to one of a plurality of categories based on at least one of a plurality of attributes of each entry; ranking, for each criterion in a set of criteria, the plurality of categories based on the criterion and a set of entries in each category, each criterion in the set of criteria using a unique set of the plurality of attributes; generating a Venn diagram for displaying the rankings, the Venn diagram including a circle for each criterion and at least one visual representation for each of the plurality of categories of entries; and providing the Venn diagram for display to a user.

A second aspect of the invention provides a system for managing data, the system comprising: a module for assigning each of a plurality of entries in the data to one of a plurality of categories based on at least one of a plurality of attributes of each entry; a module for ranking, for each criterion in a set of criteria, the plurality of categories based on the criterion and a set of entries in each category, each criterion in the set of criteria using a unique set of the plurality of attributes; a module for generating a Venn diagram for displaying the rankings, the Venn diagram including a circle for each criterion and at least one visual representation for each of the plurality of categories of entries; and a module for providing the Venn diagram for display to a user.

A third aspect of the invention provides a computer program comprising program code stored on a computer-readable medium, which when executed, enables a computer system to implement a method of managing data, the method comprising: assigning each of a plurality of entries in the data to one of a plurality of categories based on at least one of a plurality of attributes of each entry; ranking, for each criterion in a set of criteria, the plurality of categories based on the criterion and a set of entries in each category, each criterion in the set of criteria using a unique set of the plurality of attributes; generating a Venn diagram for displaying the rankings, the Venn diagram including a circle for each criterion and at least one visual representation for each of the plurality of categories of entries; and providing the Venn diagram for display to a user.

A fourth aspect of the invention provides a method of generating a system for managing data, the method comprising: providing a computer system operable to: assign each of a plurality of entries in the data to one of a plurality of categories based on at least one of a plurality of attributes of each entry; rank, for each criterion in a set of criteria, the plurality of categories based on the criterion and a set of entries in each category, each criterion in the set of criteria using a unique set of the plurality of attributes; generate a Venn diagram for displaying the rankings, the Venn diagram including a circle for each criterion and at least one visual representation for each of the plurality of categories of entries; and provide the Venn diagram for display to a user.

A fifth aspect of the invention provides a user interface, the user interface comprising: a Venn diagram that includes: a set of circles, each circle corresponding to a criterion in a set of criteria; and a plurality of tag clouds, each tag cloud corresponding to a category and a ranking for the category based on one of the set of criteria.

Other aspects of the invention provide methods, systems, program products, and methods of using and generating each, which generate the user interface described herein.

Still other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The inventors propose that certain types of data, such as data on a system being developed (e.g., created, maintained, and/or the like), may comprise a "Long Tail" distribution, in which the tail comprises a collection of lower priority issues that are not selected to be addressed prior to the release of a version of the system. As a result, previous approaches to identifying issues to be addressed prior to the deployment of a version of the system may fail to provide a maximum possible return on investment (ROI). To address this situation, aspects of the invention provide a solution that utilizes a Venn diagram to enable user(s) to interactively explore the issues from multiple perspectives simultaneously. Utilizing the Venn diagram, user(s) will be enabled to make more richly informed comparisons, judgments, trade-offs, and/or the like.

In an illustrative embodiment, the invention is described in conjunction with system data for a target system being developed. For example, the target system can comprise a software application and the system data can comprise a list of software defects that have been identified. However, it is understood that aspects of the invention apply to various types of system data, such as customer requirements, online help, and/or the like. Further, it is understood that aspects of the invention apply to other types of data. To this extent, various embodiments of the invention can be implemented in any application domain.

As indicated above, aspects of the invention provide a solution that displays ranked categories of data in a Venn diagram. In particular, entries of data are assigned to one of a plurality of categories based on one or more attributes of the entries. The categories are then ranked for each of one or more criteria. Each criterion can use a unique set of the attributes to rank the categories. A Venn diagram is generated that includes a circle for each criterion and displays the rankings of the various categories using one or more visual representations of each category. For example, the rankings can be displayed using tag clouds for each category that are placed in each circle. Two or more circles can overlap in which case categories that have one or more entries that meet all the corresponding criteria can be displayed in the overlapping portion of the circles. In this manner, a user can utilize the Venn diagram to identify relationships between various criteria and the corresponding entries, and as a result, more readily identify high value/priority entries. As used herein, unless otherwise noted, the term "set" means one or more (i.e., at least one) and the phrase "any solution" means any now known or later developed solution. Additionally, it is understood that the term "circle", when used in conjunction with the Venn diagram, includes any closed plane figure for identifying a category in the Venn diagram (e.g., ellipse, polygon, irregular shape, and/or the like).

Figure 1:
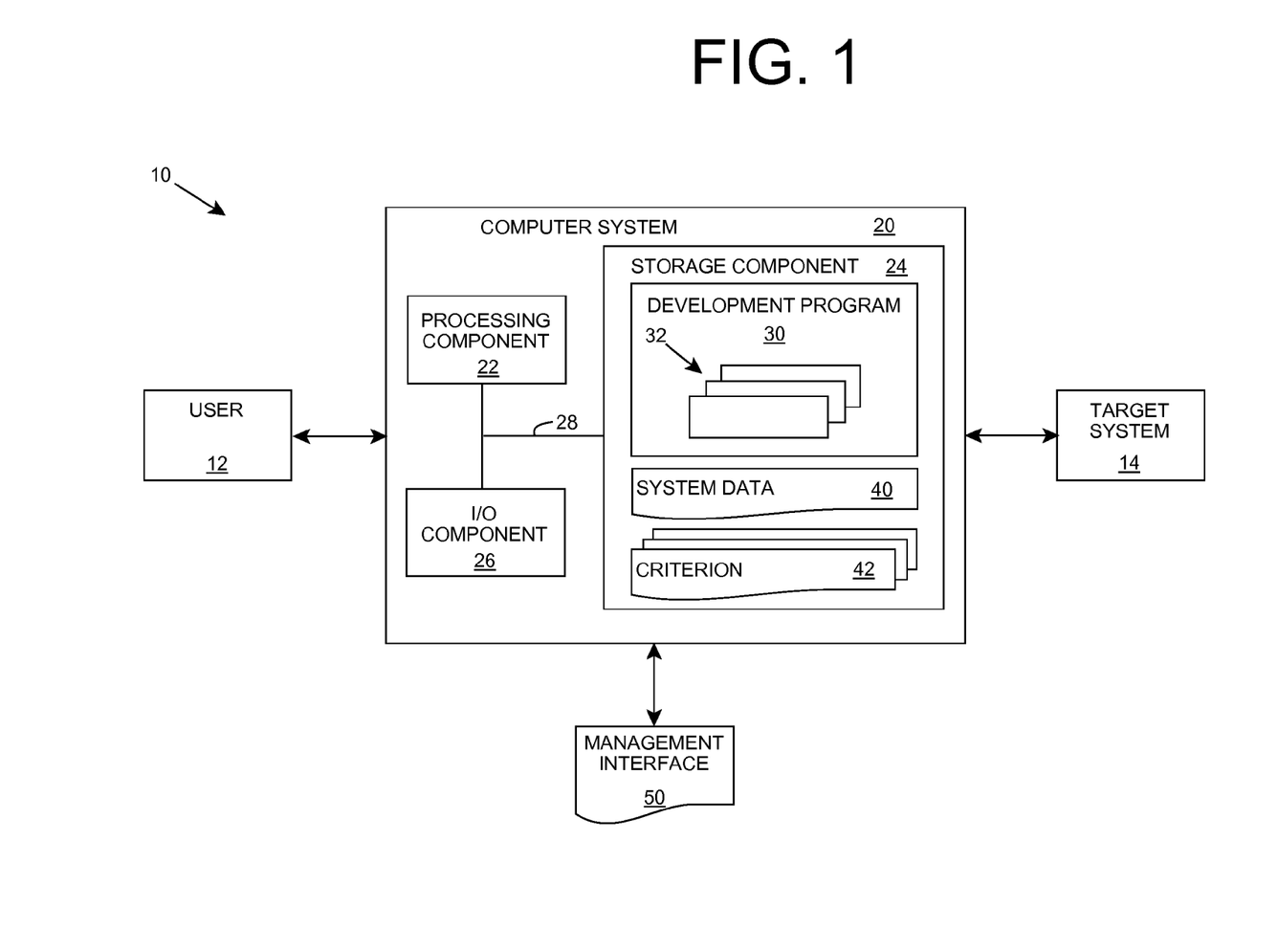
FIG. 1 shows an illustrative environment for developing a target system according to an embodiment.

Turning to the drawings, FIG. 1 shows an illustrative environment 10 for developing a target system 14 according to an embodiment. To this extent, environment 10 includes a computer system 20 that can perform a process described herein in order to develop target system 14. In particular, computer system 20 is shown including a development program 30, which makes computer system 20 operable to develop target system 14 by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as development program 30, which is at least partially stored in storage component 24. While executing program code, processing component 22 can read and/or write data to/from storage component 24 and/or I/O component 26. Pathway 28 provides a communications link between each of the components in computer system 20. I/O component 26 can comprise one or more human I/O devices, which enable a human user 16 to interact with computer system 20 and/or one or more communications devices to enable a system user 16 to communicate with computer system 20 using any type of communications link.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, development program 30 can be embodied as any combination of system software and/or application software. Further, development program 30 can be implemented using a set of modules 32. In this case, a module can comprise a component that performs a set of actions used by development program 30, and can be separately developed and/or implemented from other portions of development program 30. Further, it is understood that some of the functionality discussed herein may not be implemented or additional functionality may be included as part of computer system 20.

When computer system 20 comprises multiple computing devices, each computing device can have only a portion of development program 30 installed thereon (e.g., one or more modules 32). However, it is understood that computer system 20 and development program 30 are only representative of various possible equivalent computer systems that may perform a process described herein. To this extent, in other embodiments, the functionality provided by computer system 20 and development program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

Figure 2:
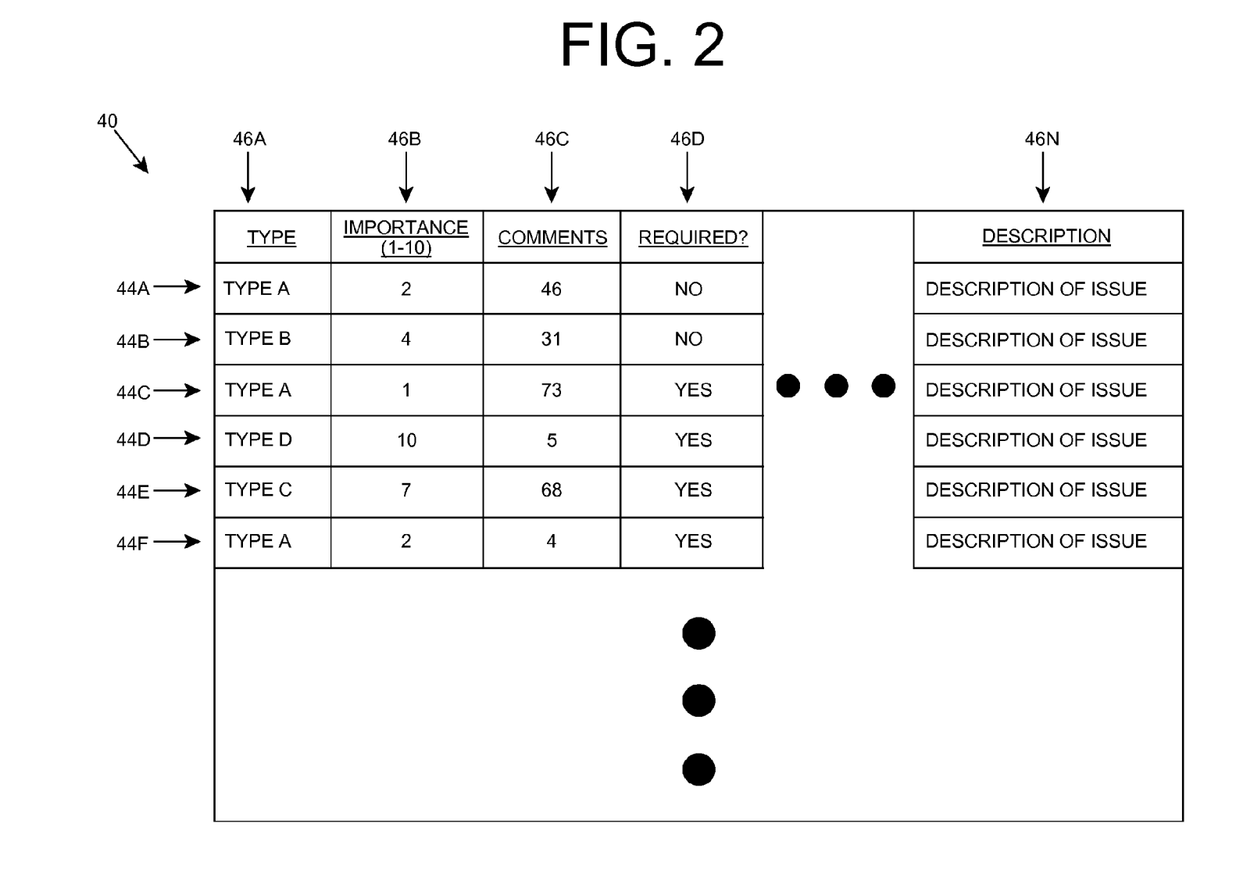
FIG. 2 shows illustrative system data according to an embodiment.

As discussed herein, development program 30 enables computer system 20 to develop a target system 14. To this extent, computer system 20 can manage system data 40, which includes data on target system 14, using any solution. For example, FIG. 2 shows illustrative system data 40 according to an embodiment, which computer system 20 can store using any database and process using any set of data structures. System data 40 includes entries 44A-F, each of which includes a plurality of attributes 46A-N. In the illustrative system data 40, each entry 44A-F includes the attributes: type 46A, importance 46B, comments 46C, required 46D, and description 46N. It is understood that attributes 46A-N are a non-limiting example, and that entries in system data 40 can include any combination of attributes. In any event, entries 44A-F can comprise data any type of issues with respect to target system 14 (FIG. 1), such as, defects, customer requirements, help topics, enhancements, fixes/modifications, and/or the like.

Returning to FIG. 1, computer system 20 can generate and manage a set of management interfaces 50, which enable a user 12 to manage (e.g., view, modify, add, delete, and/or the like), system data 40. To this extent, management interface 50 can enable user 12 to add a new entry to system data 40, view some or all of the entries in system data 40, and/or the like. It is understood that computer system 20 can limit one or more operations that user 12 can perform and/or the entries in system data 40 user 12 can view/modify using any solution (e.g., identification with permission level). Further, while the set of management interfaces 50 can comprise one or more user interfaces, it is understood that the set of management interfaces 50 also can include a programming interface, such as an application program interface (API) or the like.

Figure 3:
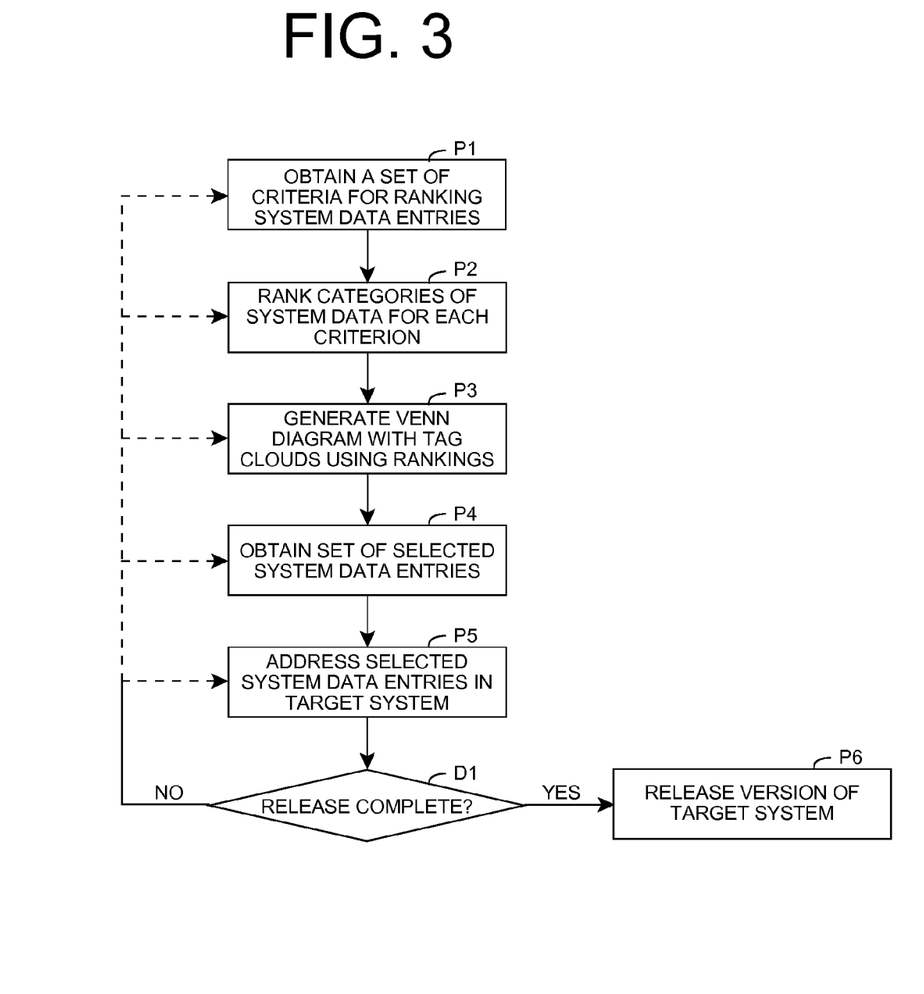
FIG. 3 shows an illustrative process for developing a target system according to an embodiment.

In an embodiment, computer system 20 generates a unique management interface 50, which enables user 12 to more effectively compare groups of entries and effectively explore a potential "Long Tail" distribution for the entries in system data 40. User 12 can utilize management interface 50 as part of developing (e.g., creating, maintaining, and/or the like) target system 14. To this extent, FIG. 3 shows an illustrative process for developing target system 14 according to an embodiment, which can be implemented by computer system 20. Referring to FIGS. 1 and 3, in process P1, computer system 20 obtains a set of criteria 42 for ranking categories of entries in system data 40. To this extent, computer system 20 can enable user 12 to dynamically define and/or select a set of categories using any solution. Computer system 20 can assign each entry in system data 40 to one of a plurality of categories using any solution. For example, referring briefly to FIG. 2, computer system 20 can assign each entry 44A-F to a category based on type attribute 46A. In this case, type attribute 46A can comprise a finite number of values, each of which comprises a unique category. However, it is understood that computer system 20 can use any combination of one or more attributes 46A-N to categorize entries 44A-F.

A set of criteria can include multiple criteria, each of which ranks categories of entries in system data 40 using a solution that is unique from the other criteria in the set of criteria. Each criterion 42 can rank the categories using any solution. To this extent, a criterion 42 can use the values for one or more attributes of each entry. For example, a criterion 42 can rank categories based on a number of entries in each category having a value for one or more attributes that indicate(s) a relative importance of the entry with respect to the attribute(s). Referring again to FIG. 2, a criterion 42 can rank categories based on a number of entries in each category that: have a high importance (e.g., a value for importance attribute 46B greater than seven); are frequently commented on (e.g., a value for comments attribute 46C greater than fifty); are required for implementation (e.g., a value of "YES" for required attribute 46D); and/or the like. To this extent, each criterion 42 can rank categories of the system data 40 from a different perspective.

Returning to FIGS. 1 and 3, in process P2, computer system 20 can rank the categories of system data 40 for each criterion 42 in the set of criteria. To this extent, computer system 20 can apply each criterion 42 to the entries in each category of system data 40 and rank the categories based on the number of entries, if any, in each category that meet the criterion 42. Based on the number of entries, computer system 20 can assign each category to one of a plurality of rankings. For example, computer system 20 can use a group of three rankings (e.g., high, medium, and low) and assign a category to one of the three rankings. Computer system 20 can use any solution for assigning categories to the rankings. For example, each ranking can include an approximately equivalent number of categories, each ranking can include categories having a number of entries within a particular range, and/or the like. Further, computer system 20 can store an identifier for each entry that met the corresponding criterion 42 and/or a score (e.g., the number of entries) for each category/criterion combination.

Figure 4A:
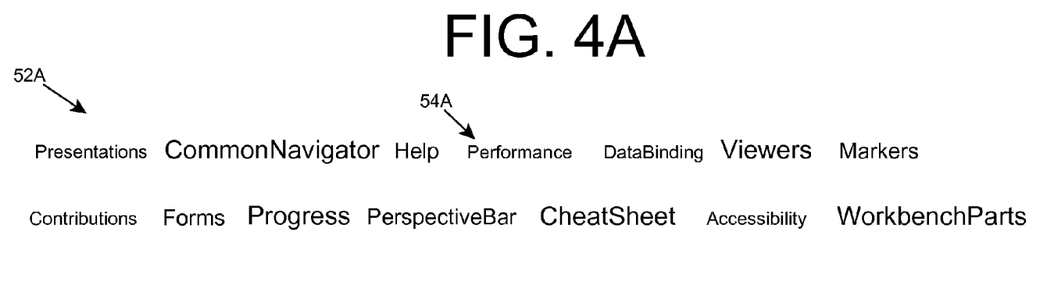
FIGS. 4A-C show illustrative groups of tag clouds indicating categories and their corresponding rankings for three different criteria according to an embodiment.
Figure 4B:
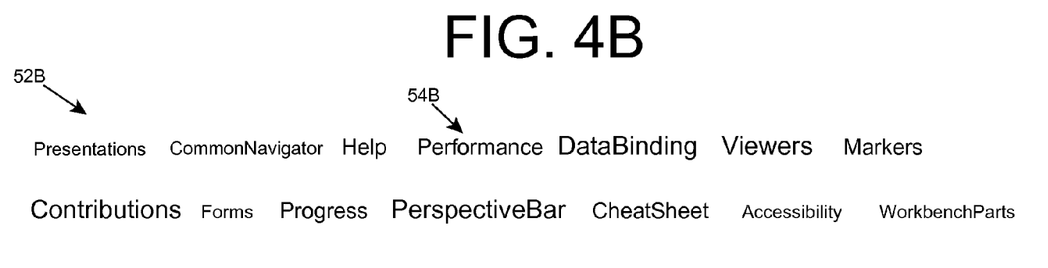
Figure 4C:
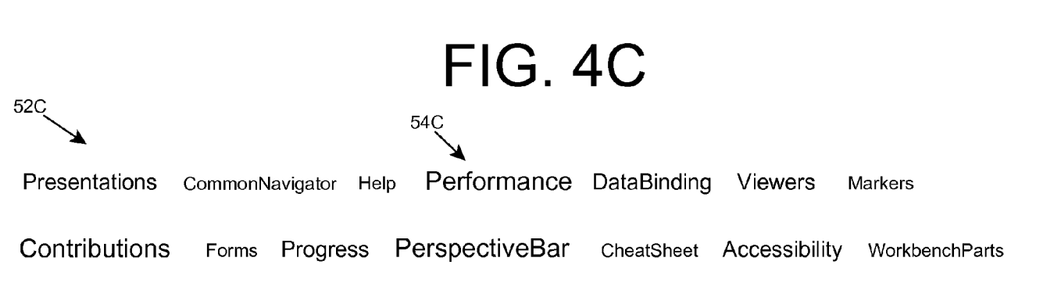

Once ranked, computer system 20 can generate visual representations for each category that also indicate the corresponding ranking for the category. In an embodiment, computer system 20 uses tag clouds to visually represent the ranking of each category. To this extent, FIGS. 4A-C show illustrative groups of tag clouds 52A-C, respectively, indicating categories and their corresponding rankings for three different criteria according to an embodiment. For purposes of discussion, tag cloud group 52A can correspond to rankings of categories based on a number of severe (e.g., high importance/priority) entries; tag cloud group 52B can correspond to rankings of categories based on a number of entries having a high comment frequency; and tag cloud group 52C can correspond to rankings of categories based on a number of entries labeled must fix.

As illustrated, computer system 20 (FIG. 1) can use a different font size for each of the rankings (e.g., three in the illustrative cloud groups 52A-C). For example, a larger font size can indicate a relatively high ranking, while a smaller font size can indicate a relatively low ranking. Regardless, it is understood that computer system 20 can use any combination of various solutions for rendering various emphases of categories, including, but not limited to: changing size, color, style, and/or the like; adding/removing effects; adding/removing graphical indicators; relative positioning; and/or the like. In any event, a category can be ranked differently for different criteria 42 (FIG. 1). For example, the Performance category tag clouds 54A-C indicate that the category is ranked low in cloud group 52A, medium in cloud group 52B, and high in cloud group 52C.

Figure 5:
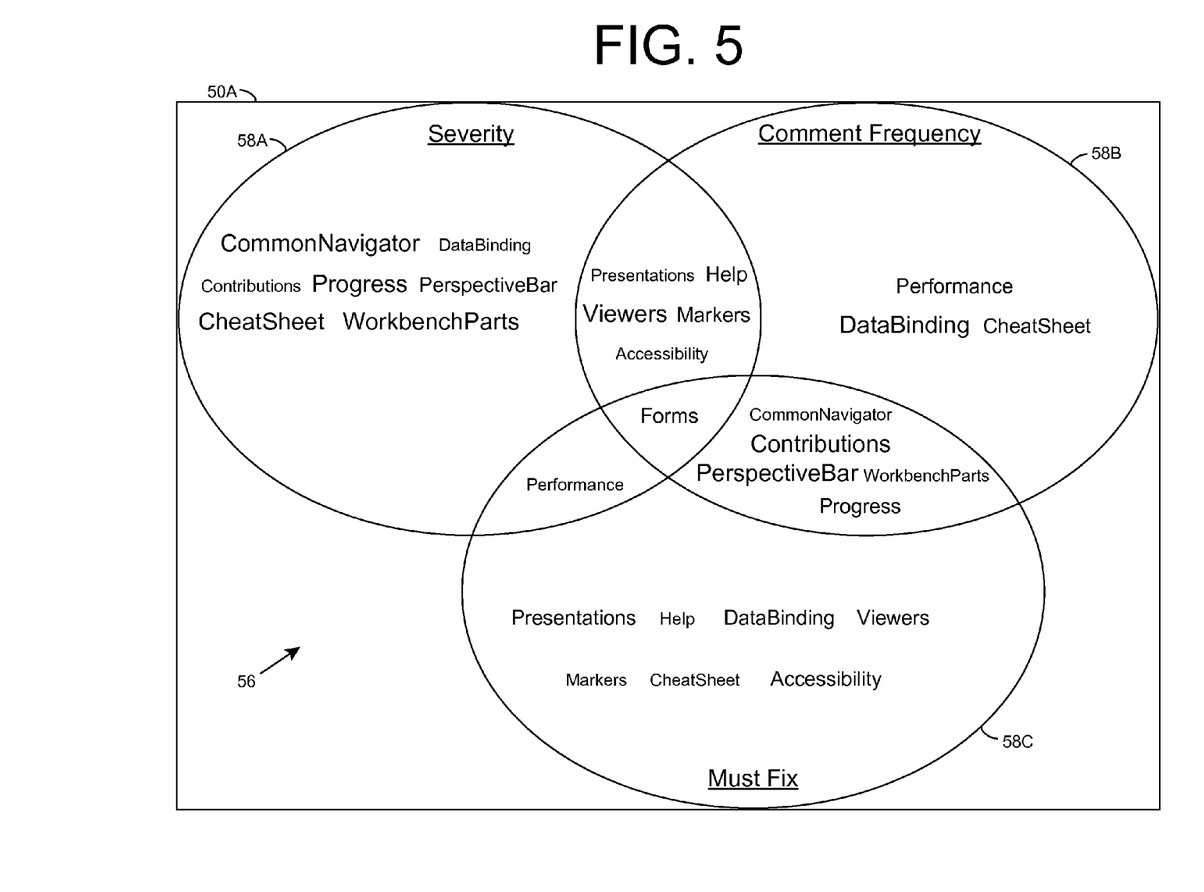
FIG. 5 shows an illustrative interface including an illustrative Venn diagram according to an embodiment.

In any event, returning to FIGS. 1 and 3, in process P3, computer system 20 can generate a management interface 50, which includes a Venn diagram for displaying the rankings for each criterion 42. FIG. 5 shows an illustrative management interface 50A including an illustrative Venn diagram 56 according to an embodiment, which can be generated by computer system 20 (FIG. 1). Venn diagram 56 can be generated based on the categories and their corresponding rankings for three different criteria shown in FIGS. 4A-C. To this extent, Venn diagram 56 includes three circles 58A-C: circle 58A corresponds to the rankings of categories based on a number of severe entries; circle 58B corresponds to the rankings of categories based on a number of entries having a high comment frequency; and circle 58C corresponds to the rankings of categories based on a number of entries labeled must fix.

Each circle 58A-C in Venn diagram 56 can have a visual appearance that is unique from the other circles 58A-C. For example, each circle 58A-C can include a label (large font and underlined), which indicates the corresponding criterion. However, it is understood that Venn diagram 56 and/or circles 58A-C can identify the criterion for each circle 58A-C using any solution. In any event, each circle 58A-C includes a visual representation for each of the plurality of categories. As illustrated, the visual representations comprise the tag clouds shown in FIGS. 4A-C. However, it is understood that this is only illustrative and other visual representations can be used.

Referring to FIGS. 1 and 5, when multiple criteria 42 are displayed in Venn diagram 56, two or more circles 58A-C can overlap. In this case, computer system 20 can determine an intersection between the sets of entries for each category in the corresponding criterion 42. When the intersection is not empty, computer system 20 can place the visual representation for the category within the overlapping portion of the circles 58A-C. However, when the intersection is empty, computer system 20 can place separate visual representations within the non-overlapping portions of the circles 58A-C. For example, circles 58A, 58B include an overlapping portion that includes the visual representations of several categories (e.g., Presentations, Help, Viewers, Markers, Accessibility, Forms) indicating that each of these categories includes at least one entry that meets both of the corresponding criteria 42. It is understood that this can be readily extended to any number of overlapping circles 58A-C. For example, the visual representation for the Forms category is located in a portion of all three circles 58A-C, indicating the at least one entry in the Forms category meets all three criteria 42.

When a visual representation is placed within an overlapping portion of two or more circles 58A-C, computer system 20 can use any solution for determining the type of visual representation to use. In an embodiment, computer system 20 prioritizes the criteria 42 and uses the visual representation of the criterion 42 having a higher priority. For example, in Venn diagram 56 the circle 58A can have the highest priority and circle 58C can have the lowest priority. Alternatively, computer system 20 can use the visual representation having the highest ranking. For example, if a category has a low ranking for one criterion 42 and a high ranking for another criterion 42, computer system 20 can use a visual representation that indicates the category has a high ranking in the overlapping region of two circles corresponding to the two criteria 42. Regardless, it is understood that numerous alternative solutions can be implemented by computer system 20.

Once generated, computer system 20 can provide management interface 50A for display to user 12. Computer system 20 can enable user 12 to manipulate one or more aspects of Venn diagram 56 and/or management interface 50A. For example, management interface 50A can include one or more user interface controls that enable user 12 to move circles 58A-C so that they are or are not overlapping. In response, computer system 20 can adjust the visual representations of the categories accordingly. Further, user 12 can add/remove circles 58A-C to/from Venn diagram 56. For example, user 12 could request that a circle be added to Venn diagram 56 for a fourth criterion, e.g., based on a frequency in which an administrative status is changed. In response, computer system 20 can add the circle and corresponding visual representations to Venn diagram 56. Similarly, user 12 could request to remove circle 58C, and in response, computer system 20 can remove the circle 58C and readjust the visual representations in the previously overlapping portions of circles 58A-B accordingly.

Additionally, user 12 can request to expand (e.g., drill down) one or more of the categories, e.g., by selecting the corresponding visual representation in a circle. In response, computer system 20 can generate a management interface 50, which includes an expanded view of the set of entries for the category and the corresponding at least one criterion and provide the expanded view of display to user 12. For example, the expanded view could comprise a chart of the entries as shown in FIG. 2. Regardless, when user 12 selects a visual representation in a single circle (e.g., Progress in severity circle 58A), computer system 20 can display the set of entries for the corresponding category that meet the corresponding criterion 42. Similarly, when user 12 selects a visual representation located in an overlapping portion of two or more circles 58A-C (e.g., Forms in circles 58A-C), computer system 20 can perform a union operation on the corresponding sets of entries. Further, in the expanded view, computer system 20 can highlight the entry(ies) that met all of the criteria 42, thereby causing the visual representation to be placed in the overlapping portion, using any solution. Regardless, user 12 can select one or more entries in the expanded view for further action using any solution.

In this manner, user 12 can compare various sets of entries corresponding to different criteria and interactively assess their relationships. Venn diagram 56 enables the visualization of complementary information that may otherwise remain hidden in system data 40. As a result, user 12 can find entries that may have a high value due to their presence in one or more overlapping regions of criteria.

Returning to FIGS. 1 and 3, in process P4, computer system 20 can obtain a set of selected entries using any solution. In process P5, computer system 20 can address the set of selected entries in target system 14. For example, computer system 20 can provide the set of selected entries for action (e.g., by displaying them as priorities for implementation in target system 14 by a group of developers). Subsequently, once an entry has been addressed (e.g., implemented in target system 14), a user 12 can change a status of the entry or the like, indicating that it has been addressed. In decision D1, computer system 20 and/or user 12 can determine whether a release of target system 14 is complete. If so, in process P6, computer system 20 and/or user 12 can release a version of target system 14 using any solution. Otherwise, the process can return to any of processes P1-5 for further development of target system 14. To this extent, it is understood that processes P1-5 can be performed any number of times in any order, including simultaneously, in order to generate a new version of target system 14 for release.

While shown and described herein as a method and system for developing a target system, it is understood that aspects of the invention further provide various alternative embodiments. For example, in one embodiment, the invention provides a computer program stored on at least one computer-readable medium, which when executed, enables a computer system to develop a target system. To this extent, the computer-readable medium includes program code, such as development program 30 (FIG. 1), which implements some or all of a process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; a modulated data signal having one or more of its characteristics set and/or changed in such a manner as to encode information in the signal; paper; and/or the like.

In another embodiment, the invention provides a method of generating a system for developing a target system. In this case, a computer system, such as computer system 20 (FIG. 1), can be obtained (e.g., created, maintained, made available, etc.) and one or more programs/systems for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing devices to the computer system; and (3) incorporating and/or modifying the computer system to enable it to perform a process described herein.

It is understood that aspects of the invention can be implemented as part of a business method that performs a process described herein on a subscription, advertising, and/or fee basis. That is, a service provider could offer to develop a target system as described herein. In this case, the service provider can manage (e.g., create, maintain, support, etc.) a computer system, such as computer system 20 (FIG. 1), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing data, the method comprising:
   assigning each of a plurality of entries in the data to one of a plurality of categories based on at least one of a plurality of attributes of each entry;
   ranking, for each criterion in a set of criteria, the plurality of categories based on the criterion and a set of entries in each category, each criterion in the set of criteria using a unique set of the plurality of attributes distinct from the at least one of the plurality of attributes corresponding to each of the plurality of categories;
   generating a Venn diagram for displaying the rankings, the Venn diagram including a circle for each criterion and at least one visual representation for each of the plurality of categories corresponding to at least one of the set of criteria, wherein each of the at least one visual representation comprises an emphasis corresponding to the ranking for the corresponding category and is visually associated with the circle for the corresponding criterion; and
   providing the Venn diagram for display to a user.

2. The method of claim 1, wherein the circle for each criterion has a visual appearance that is unique from the circle for every other criterion.

3. The method of claim 1, wherein the at least one visual representation comprises a tag cloud.

4. The method of claim 1, wherein the set of criteria includes a plurality of criteria and wherein the Venn diagram includes at least two overlapping circles.

5. The method of claim 4, the generating including:
   determining an intersection between the sets of entries for at least two criteria for each category;
   placing a visual representation in an overlapping portion of the circles for the at least two criteria when the intersection is not empty; and
   placing a visual representation in non-overlapping portions of each of the circles for the at least two criteria when the intersection is empty.

6. The method of 1, wherein the ranking includes:
   determining a number of entries in each category having a value for an attribute that indicates a relative importance of the entry with respect to the attribute; and
   classifying each category into one of a plurality of rankings based on the number.

7. The method of claim 1, further comprising:
   receiving a set of selected entries; and
   providing the set of selected entries for action.

8. The method of claim 1, further comprising:
   receiving a request to expand a category in at least one circle;
   generating a expanded view of the set of entries for the category and the at least one criterion corresponding to the at least one circle; and
   providing the expanded view for display to the user.

9. A computer system comprising:
   at least one computing device including a processor and a storage hardware component having a development program stored thereon, wherein the at least one computing device is configured to manage data by executing, on the processor, the development program, the development program instructing the computing device to carry out:
   assigning each of a plurality of entries in the data to one of a plurality of categories based on at least one of a plurality of attributes of each entry;
   ranking, for each criterion in a set of criteria, the plurality of categories based on the criterion and a set of entries in each category, each criterion in the set of criteria using a unique set of the plurality of attributes distinct from the at least one of the plurality of attributes corresponding to each of the plurality of categories;
   generating a Venn diagram for displaying the rankings, the Venn diagram including a circle for each criterion and at least one visual representation for each of the plurality of categories corresponding to at least one of the set of criteria, wherein each of the at least one visual representation comprises an emphasis corresponding to the ranking for the corresponding category and is visually associated with the circle for the corresponding criterion; and providing the Venn diagram for display to a user.

10. The system of claim 9, wherein the at least one visual representation comprises a tag cloud.

11. The system of claim 9, wherein the set of criteria includes a plurality of criteria and wherein the Venn diagram includes at least two overlapping circles.

12. The system of claim 11, the generating including:
determining an intersection between the sets of entries for at least two criteria for each category;
placing a visual representation in an overlapping portion of the circles for the at least two criteria when the intersection is not empty; and
placing a visual representation in non-overlapping portions of each of the circles for the at least two criteria when the intersection is empty.

13. The system of claim 9, wherein the ranking includes:
determining a number of entries in each category having a value for an attribute that indicates a relative importance of the entry with respect to the attribute; and
classifying each category into one of a plurality of rankings based on the number.

14. The system of claim 9, wherein the component configured to manage data further manages the data by:
receiving a request to expand a category in at least one circle;
generating a expanded view of the set of entries for the category and the at least one criterion corresponding to the at least one circle; and
providing the expanded view for display to the user.

15. A computer program comprising program code stored on a computer-readable storage hardware component, which when executed, enables a computer system to implement a method of managing data, the method comprising:
assigning each of a plurality of entries in the data to one of a plurality of categories based on at least one of a plurality of attributes of each entry;
ranking, for each criterion in a set of criteria, the plurality of categories based on the criterion and a set of entries in each category, each criterion in the set of criteria using a unique set of the plurality of attributes distinct from the at least one of the plurality of attributes corresponding to each of the plurality of categories;
generating a Venn diagram for displaying the rankings, the Venn diagram including a circle for each criterion and at least one visual representation for each of the plurality of categories corresponding to at least one of the set of criteria, wherein each of the at least one visual representation comprises an emphasis corresponding to the ranking for the corresponding category and is visually associated with the circle for the corresponding criterion; and
providing the Venn diagram for display to a user.

16. The computer program of claim 15, wherein the at least one visual representation comprises a tag cloud.

17. The computer program of claim 15, wherein the set of criteria includes a plurality of criteria and wherein the Venn diagram includes at least two overlapping circle, the generating including:
determining an intersection between the sets of entries for at least two criteria for each category;
placing a visual representation in an overlapping portion of the circles for the at least two criteria when the intersection is not empty; and
placing a visual representation in non-overlapping portions of each of the circles for the at least two criteria when the intersection is empty.

18. The computer program of claim 15, wherein the ranking includes:
determining a number of entries in each category having a value for an attribute that indicates a relative importance of the entry with respect to the attribute; and
classifying each category into one of a plurality of rankings based on the number.

19. The computer program of claim 15, the method further comprising:
receiving a request to expand a category in at least one circle;
generating a expanded view of the set of entries for the category and the at least one criterion corresponding to the at least one circle; and
providing the expanded view for display to the user.

20. A method of generating a system for managing data, the method comprising:
providing a computer system operable to:
assign each of a plurality of entries in the data to one of a plurality of categories based on at least one of a plurality of attributes of each entry;
rank, for each criterion in a set of criteria, the plurality of categories based on the criterion and a set of entries in each category, each criterion in the set of criteria using a unique set of the plurality of attributes distinct from the at least one of the plurality of attributes corresponding to each of the plurality of categories;
generate a Venn diagram for displaying the rankings, the Venn diagram including a circle for each criterion and at least one visual representation for each of the plurality of categories corresponding to at least one of the set of criteria, wherein each of the at least one visual representation comprises an emphasis corresponding to the ranking for the corresponding category and is visually associated with the circle for the corresponding criterion; and
provide the Venn diagram for display to a user.

* * * * *